United States Patent [19]
Emi

[11] Patent Number: 5,541,954
[45] Date of Patent: Jul. 30, 1996

[54] FREQUENCY HOPPING COMMUNICATION METHOD AND APPARATUS CHANGING A HOPPING FREQUENCY AS A RESULT OF A COUNTED NUMBER OF ERRORS

[75] Inventor: Tetsuichi Emi, Ibaraki-ken, Japan

[73] Assignee: Sanyo Electric Co., Ltd., Osaka, Japan

[21] Appl. No.: 344,666

[22] Filed: Nov. 22, 1994

[30] Foreign Application Priority Data

Nov. 24, 1993 [JP] Japan ..................... 5-293641

[51] Int. Cl.⁶ .............. H04B 15/00; H04K 1/04
[52] U.S. Cl. ............................................. 375/202
[58] Field of Search ..................... 375/202, 200, 375/285, 346

[56] References Cited

U.S. PATENT DOCUMENTS 4,479,215  10/1984  Baker .......................... 375/200
5,323,447  6/1994  Gillis et al. ..................... 379/61

FOREIGN PATENT DOCUMENTS

4-47726  2/1992  Japan .

Primary Examiner—Stephen Chin
Assistant Examiner—Hai H. Phan
Attorney, Agent, or Firm—Armstrong, Westerman, Hattori, McLeland & Naughton

[57] ABSTRACT

There is show a frequency hopping communication system. When a coding circuit 1 informs a spreading code control unit 17 of an error generation, it specifies an erred carrier frequency and counts the errors for each hopping frequency. If the counted errors exceed a fixed value in a frequency, the spreading code control unit 17 changes it to another unused frequency and informs a data communication control unit 14 of changed data. The data communication control unit 14 sends the changed data to the other party apparatus as control data. The other party apparatus receives the control data and recognizes them and changes currently used hopping frequency to a corresponding new one.

7 Claims, 11 Drawing Sheets

HOPPING TABLE

| NO. | FREQUENCY NO. |
|---|---|
| 1 | 2 |
| 2 | 4 |
| 3 | 6 |
| . | . |
| n | A → B |
| . | . |
| N | M |

FIG.2(b)

FREQUENCY TABLE

| FREQUENCY NO. | FREQUENCY | STATE | ERROR COUNT |
|---|---|---|---|
| 1 | f1 | "0" | 0 |
| 2 | f2 | "1" | 0 |
| 3 | f3 | "0" | 0 |
| 4 | f4 | "1" | 1 |
| 5 | f5 | "0" | 0 |
| 6 | f6 | "1" | 3 |
| . | . | . | . |
| A | fa | "1" → "00" | 10000 |
| . | . | . | . |
| B | fb | → "1" | 0 |
| . | . | . | . |
| M | fm | "1" | 7 |

| No. | SPREADING CODE SERIES | | | | | | | HOPPING FREQUENCY | | | | | | |
|---|---|---|---|---|---|---|---|---|---|---|---|---|---|---|
| | T1 | T2 | T3 | T4 | T5 | T6 | T7 | T1 | T2 | T3 | T4 | T5 | T6 | T7 |
| 1 | 7 | 6 | 5 | 2 | 4 | 1 | 3 | f7 | f6 | f5 | f2 | f4 | f1 | f3 |
| 2 | 6 | 7 | 4 | 3 | 5 | 0 | 2 | f6 | f7 | f4 | f3 | f5 | f0 | f2 |
| 3 | 5 | 4 | 7 | 0 | 6 | 3 | 1 | f5 | f4 | f7 | f0 | f6 | f3 | f1 |
| 4 | 4 | 5 | 6 | 1 | 7 | 2 | 0 | f4 | f5 | f6 | f1 | f7 | f2 | f0 |
| 5 | 3 | 2 | 1 | 6 | 0 | 5 | 7 | f3 | f2 | f1 | f6 | f0 | f5 | f7 |
| 6 | 2 | 3 | 0 | 7 | 1 | 4 | 6 | f2 | f3 | f0 | f7 | f1 | f4 | f6 |
| 7 | 1 | 0 | 3 | 4 | 2 | 7 | 5 | f1 | f0 | f3 | f4 | f2 | f7 | f5 |
| 8 | 0 | 1 | 2 | 5 | 3 | 6 | 4 | f0 | f1 | f2 | f5 | f3 | f6 | f4 |

FIG.8
PRIOR ART

FREQUENCY HOPPING COMMUNICATION METHOD AND APPARATUS CHANGING A HOPPING FREQUENCY AS A RESULT OF A COUNTED NUMBER OF ERRORS

BACKGROUND OF THE INVENTION

1. Field of the Invention

This invention relates to a spread spectrum communication system, particularly to a communication method and apparatus using a frequency hopping system.

2. Description of the Related Art

The spread spectrum communication system has excellent properties such as high resistance to interference, data security, availability to high resolution range finding. Therefore, it is used in some fields like satellite communication and ground communication. In recent years, the spread spectrum communication system is progressively applied to mobile communication and local communication, etc., in expectation of such advantages as it improves utilization factor of frequency and is compatible with existing systems.

A direct spreading (DS) system and the above mentioned frequency hopping (FH) system are typical in order to realize the spread spectrum communication. Generally, the direct spreading system balancedly modulates data signals, that have gone through modulation of a carrier wave, directly by spreading codes, thereby to make an occupied bandwidth wider. The frequency hopping system switches a carrier wave for data signals into different frequencies in accordance with spreading codes, thereby to utilize a wide occupied bandwidth.

A basic structure of a conventional communication apparatus using the frequency hopping system and its communicating operation will be described referring to FIGS. 5A and 5B.

Figure 5A:
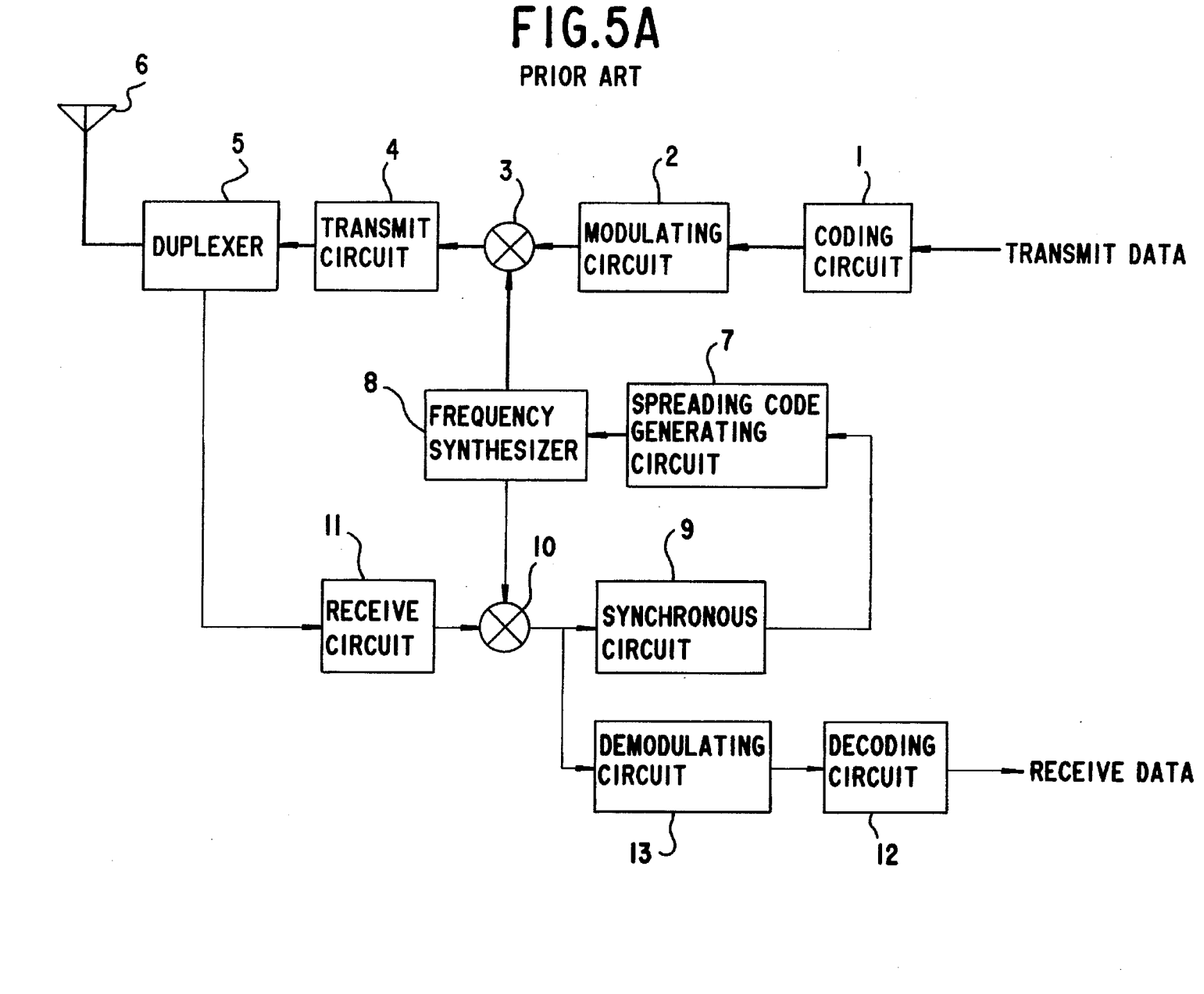
FIG. 5A is a block diagram showing a transmitting operation of a conventional frequency hopping communication apparatus.

First, a transmitting operation of the conventional frequency hopping communication apparatus is shown with reference to FIG. 5A. Transmit data is processed along a route shown by a heavy solid line in the figure.

The transmit data composed of analog signals are coded in a coding circuit 1. The coded data are modulated in a modulating circuit 2 through a modulating method like a frequency shift keying (FSK) or a phase shift keying (PSK). The modulated data are mixed with outputs of a frequency synthesizer 8 in a mixer 3. The synthesized 8 changes its output frequency or carries out frequency-hopping in accordance with a spreading code series for frequency hopping system which are generated in a spreading code generating circuit 7. The spreading code series and frequency hopping will be described later. Outputs of the mixer 3 are power-amplified in a transmit circuit 4 and sent from an aerial 6 via a duplexer 5 which alternates output of the transmit data and input of receive data.

Figure 5B:
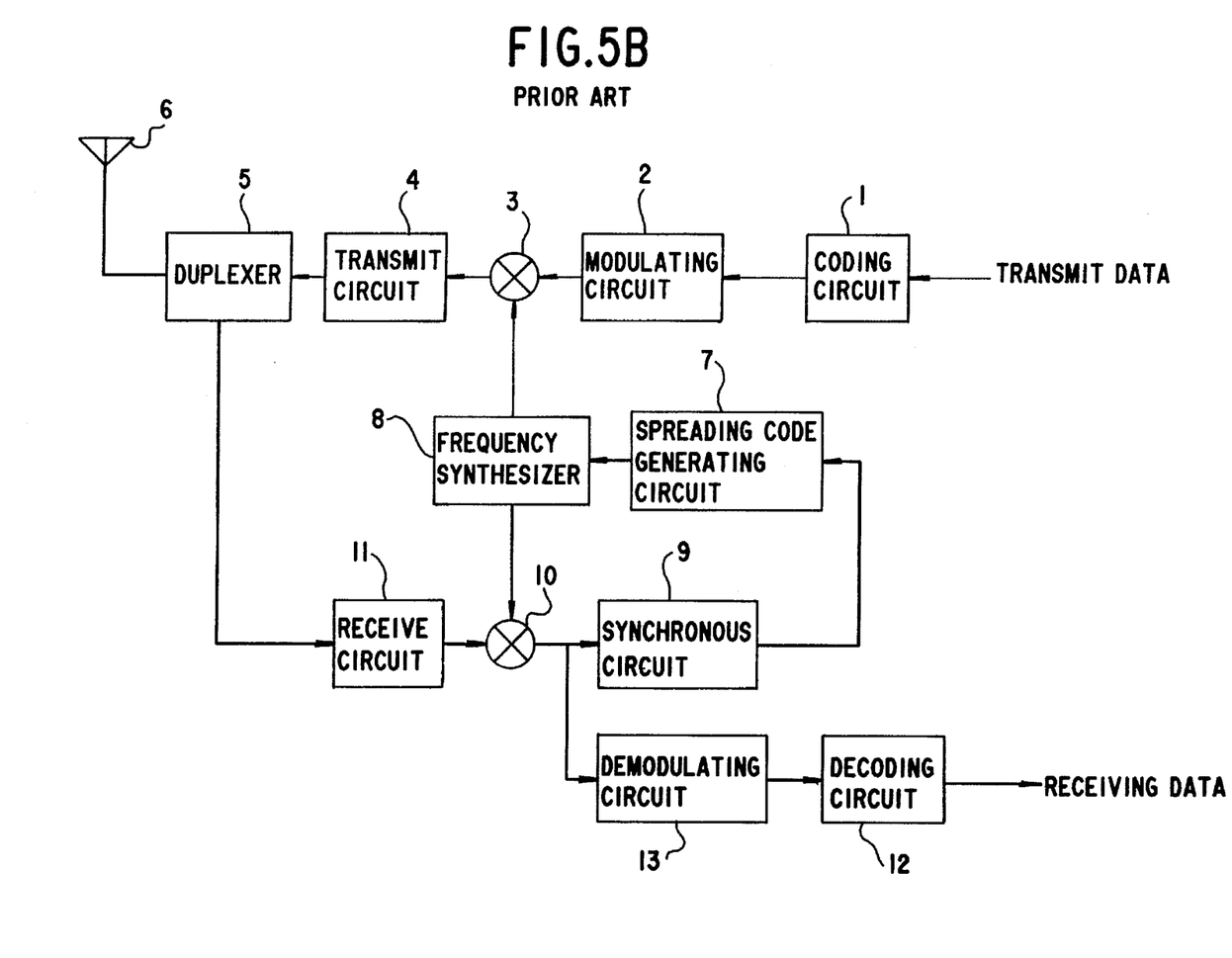
FIG. 5B is a block diagram showing a receiving operation of a conventional frequency hopping communication apparatus.

Next, the receiving operation of the communication apparatus is described referring to FIG. 5B. The receive data are processed along a route shown by a heavy solid line in the figure.

Signals received through the aerial 6 are inputted into an receive circuit 11 via the duplexer 5 and amplified through a bandpass filter of the receive circuit 11. The amplified signals are mixed with outputs of the synthesizer 8 in a mixer 10. The frequency outputted from the synthesizer 8 is hopped in accordance with spreading code series for frequency hopping system which are generated in the spreading code generating circuit 7. A synchronous circuit 9 is adapted to get and hold synchronization for the switching of the frequency in the frequency hopping system, and synchronizes the receive signals with the output frequency of the synthesizer 8. The synchronized outputs of the mixer 10 are demodulated into binary data in a demodulating circuit 13, and decoded into analog receive data in a decoding circuit 12.

Figure 6:
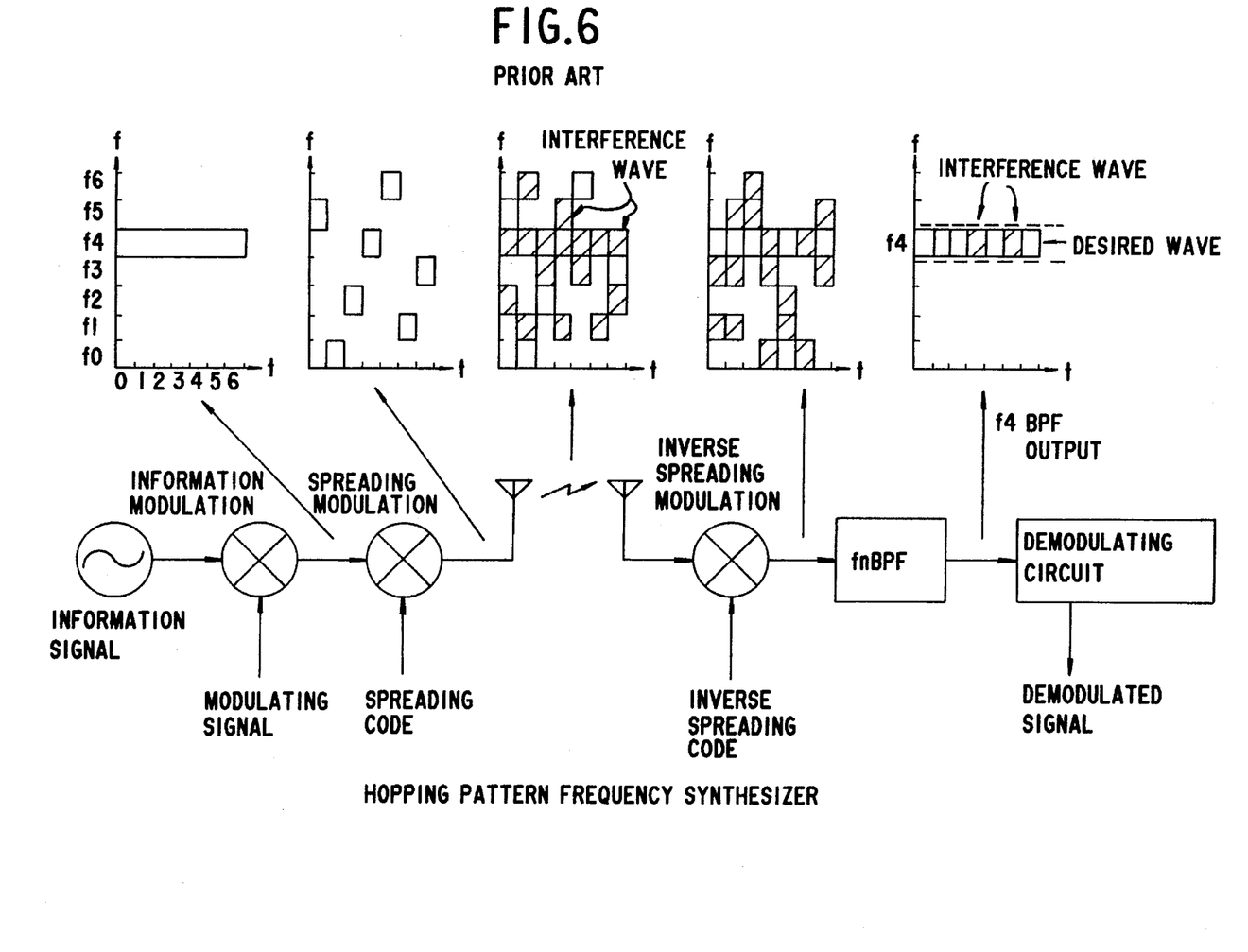
FIG. 6 is a drawing showing a principle of a frequency hopping communication system.

The above transmit and receive operation is schematically described referring to FIG. 6. FIG. 6 illustrates a principle of the frequency hopping system. In each graph in the figure, a Y-axis shows a frequency and an X-axis shows time series.

Information signals as transmit data are modulated in the modulating circuit 2 on the basis of a predetermined modulation signals, and made into signals of frequency f4, for example. The modulated signals are spreadingly modulated through hopping frequencies which are outputted from the transmitting side synthesizer 8 in accordance with pre-scribed spreading codes, for example, through frequencies f5, f0, f2, f4, f6, f1 and f3. The spreadingly modulated signals are sent from the transmitting side to a receiving side. The received signals go through inverse spreading modulation through hopping frequencies which are outputted from the receiving side synthesizer 8 in accordance with receiving side spreading codes corresponding to the spreading codes at the transmitting side. Such signals are entered into the bandpass filter incorporated in the receive circuit 11, that passes only signals of a fixed frequency fn. Then, signals of a desired frequency, e.g. the frequency f4 are outputted therefrom and demodulated into signals of frequency f4 in the demodulating circuit 13 on the basis of predetermined demodulating signals corresponding to the modulating signals at the transmitting side. Thus, demodulated signals as receive data of frequency f4 are obtained corresponding to the information signals at the transmitting side.

Figure 7:
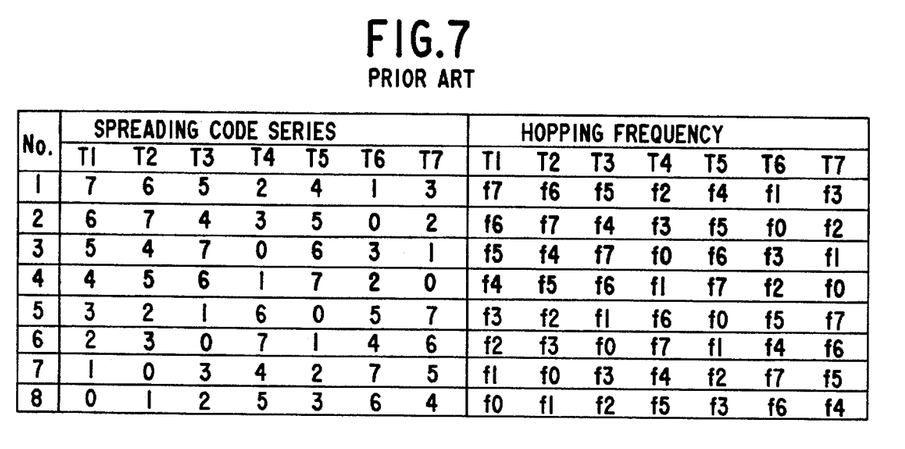
FIG. 7 is a translation table showing a relation of an allocated hopping frequencies to spreading code series in a frequency hopping communication apparatus.
Figure 8:
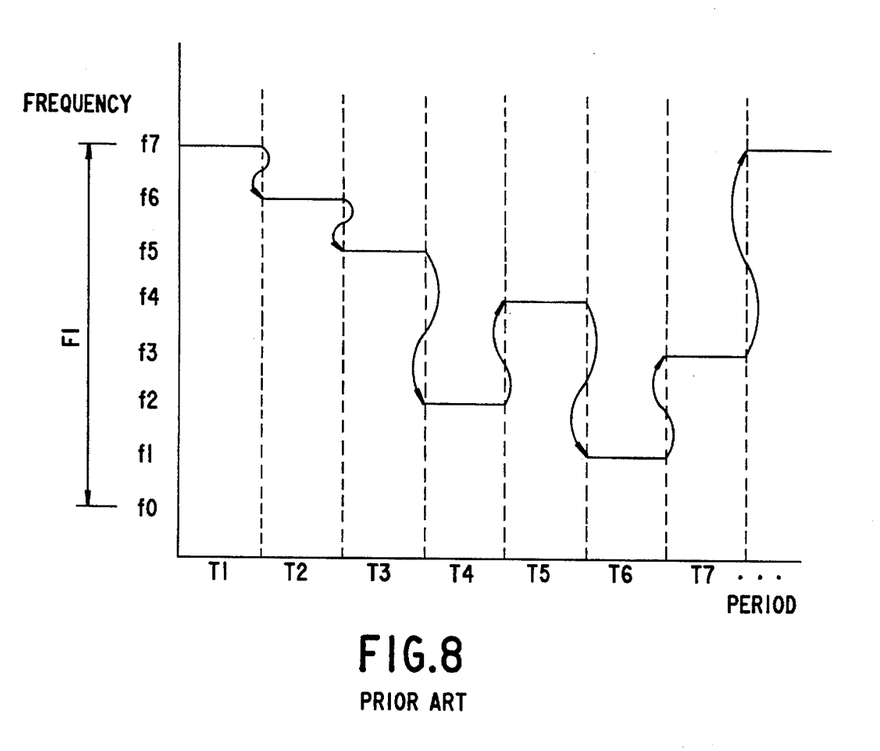
FIG. 8 is an explanatory view showing a hopping operation of a frequency hopping communication apparatus.
Figure 9:
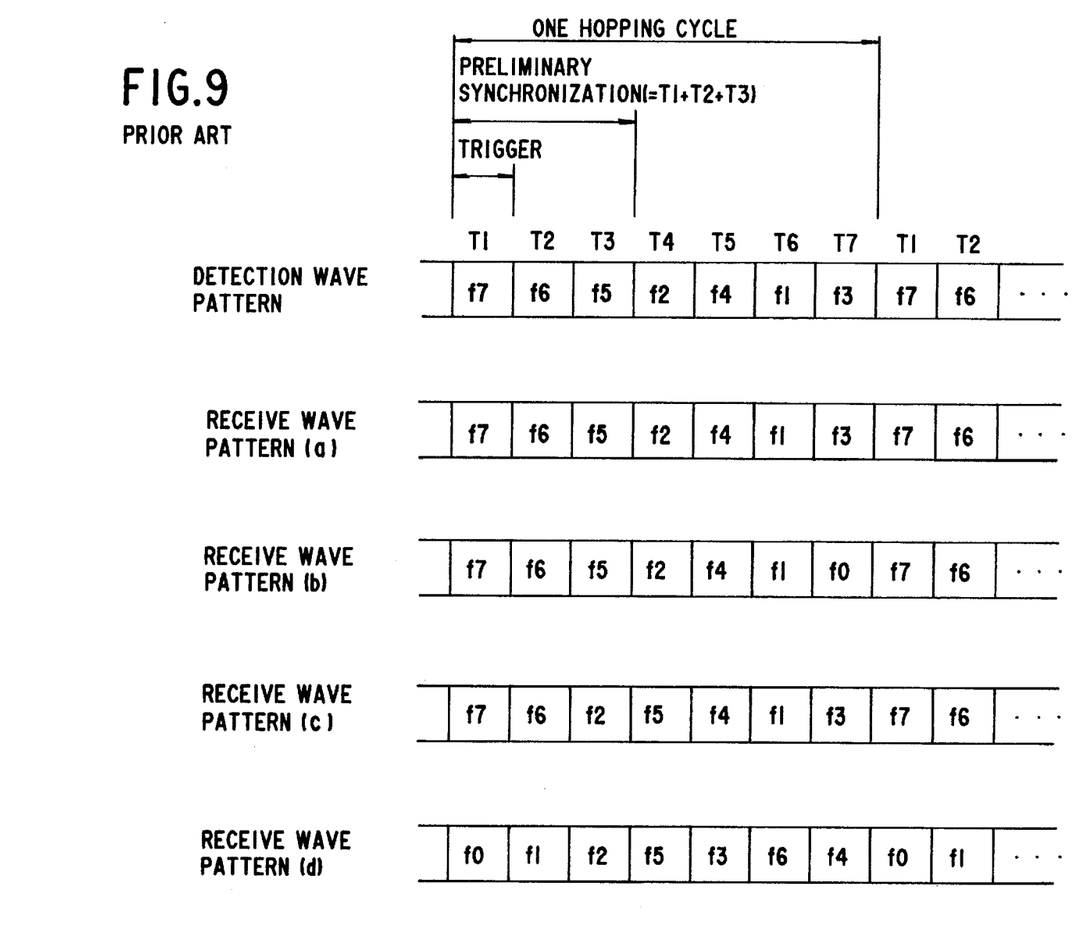
FIG. 9 is an explanatory view showing a relation between a detected hopping frequency pattern and received hopping frequency patterns in a synchronizing operation of a frequency hopping communication apparatus.
Figure 10:
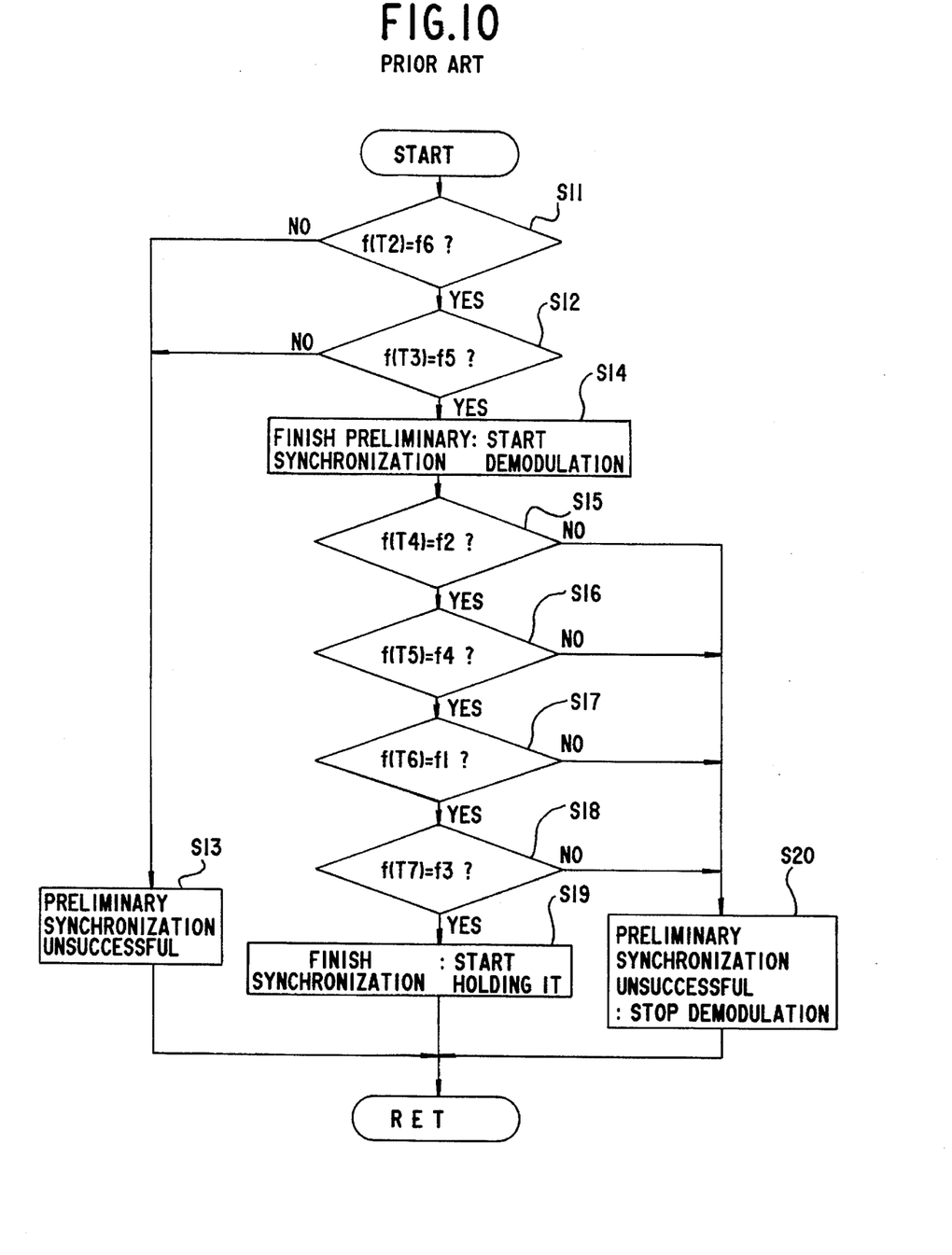
FIG. 10 is a flowchart showing a process after detection of a trigger frequency for synchronization in a frequency hopping communication apparatus.

Next, a synchronizing operation of the synchronous circuit 9 in the FH system is described in detail referring to FIGS. 7 to 10. FIG. 7 shows a relation of spreading code series and hopping frequencies allocated therefor. FIG. 8 shows a hopping operation by spreading code series of No. 1. FIG. 9 shows a relation between a detected hopping frequency pattern and received hopping frequency patterns in the synchronizing operation. FIG. 10 shows a process after detecting a trigger frequency for synchronization.

As mentioned above, the FH system carries out the modulation of the transmit data by use of the carrier frequencies generated in the spreading code generating circuit 7 at the transmitting side, e.g. the frequencies f7, f6 ,f5, f2, f4, f1, f3 that are hopped in accordance with the spreading code series No.1 for FH system in FIG. 7. Such transmit data are sent from the aerial 6. The relation between the hopped carrier frequencies f7, f6 ,f5, f2, f4, f1, f3 and the time series is shown in FIG. 8.

The receiving side communication apparatus detects received waves through the carrier frequencies f7, f6 ,f5, f2, f4, f1, f3 that are hopped in accordance with the spreading code series No.1 for FH system in the spreading code generating circuit 7. The receiving side apparatus continue detection in accordance with such pattern of hopping frequencies. However, such pattern of frequencies at the receiving side is not synchronous with a pattern of carrier hopping frequencies sent from the transmitting side apparatus. Therefore, to begin with, it is necessary to synchronize the former with the latter.

The synchronization is completed when the frequency hopping pattern of the received waves at the receiving apparatus coincides perfectly with the hopping pattern generated therein over one hopping cycle. If even one hopping frequency in the patterns differs, it means that the synchronization was unsuccessful.

Then, the synchronization is performed as follows.

First, the receiving side apparatus selects a frequency at random among the hopping frequencies of the prescribed pattern No. 1, e.g. the frequency f7, through the synchronous circuit 9. Then, the apparatus activates the routine shown in the flowchart of FIG. 10 in accordance with the detected wave pattern of FIG. 9.

The receiving side apparatus finishes a preliminary synchronization when all the frequencies f6 and f5 following the frequency f7 completely coincide between the detected wave and the received wave in steps S11 and S12. After finishing the preliminary synchronization, assuming that the detected waves and received waves are synchronized for a time being, the apparatus continues modulating provisionally with such timing in a step S14. Then, the received waves coming thereafter are continuously detected with the following hopping frequencies f2, f4, f1 and f3 of the pattern No. 1 in steps S15 to S18.

For example, the receiving side apparatus does not determine that the synchronization has been completed until the received hopping frequencies coincide perfectly with the detected frequencies over one hopping cycle after the preliminary synchronization, as shown by the received wave patter (a) of FIG. 9. Then, it activates a synchronization holding process in a step S19 so that the obtained synchronization is maintained.

As shown by a received wave pattern (b) of FIG. 9, if even one hopping frequency is not synchronous with one of the detected wave pattern for one hopping cycle during detection after the preliminary synchronization, the apparatus determines that the preliminary synchronization is unsuccessful at that moment. In this case, a frequency f0 of the received waves (b) does not coincide with a frequency f3 of the detected waves in a period T7, so that the apparatus stops modulation that has been started and exits the routine in a step S20.

As shown by a received wave pattern (c) of FIG. 9, if even one hopping frequency does not coincide with one of the detected wave pattern in the first three hopping periods t1–t3 as the preliminary synchronization periods, the apparatus determines that the preliminary synchronization is unsuccessful at that moment. In this case, a frequency f2 of the received waves (b) does not coincide with a frequency f5 of the detected waves in a period T3, so that the apparatus exits the routine in the step S20, as in the case of the received pattern (b).

As a matter of course, as shown by a received wave pattern (d) of FIG. 9, if the apparatus does not detect the frequency f7 as a trigger for synchronization for the hopping frequency pattern No. 1 of FIG. 7, the routine of FIG. 10 is not called and the synchronizing operation is not activated.

Such process is a generally used synchronizing system for the FH system and well-known.

As mentioned above, the conventional FH communication apparatus successively varies the carrier waves for spreading. It means a narrow-band transmission if seen at each period of the frequency hopping cycle. Accordingly, when a carrier frequency of this apparatus coincide with that of existing communication waves or some narrow-band jamming waves or a hopping frequency of other FH communication apparatus, the transmit signals on that frequency are error signals. For example, interference waves may coexist in a frequency shown by cross-hatching in the third graph from the left of FIG. 6. Then, such interference waves will coexist in the portions, shown by cross-hatching in the fourth and last graphs, of desired output signals passed through the bandpass filter after inverse spreading process, so that the output signals are erred. Moreover, the conventional apparatus may not be able to receive signals of a certain frequency band due to multipass phasing.

Thus, an error correction technique is necessary, and the coding circuit 1 and the decoding circuit 12 are added with another coding and decoding functions, respectively, for correcting errors. Such addition of the error correction function causes data to have redundancy in data transmission. Provided that a transmission rate is constant, throughput for data is lowered to a certain degree in order to secure transmission quality. Then, it is important what level the error correction capacity is set to. Actually, if such capacity is set very large, the data throughput is lowered accordingly. Therefore, the fact is that the error correction capacity is decided supposing an error rate in radio wave propagation. If the error correction capacity is below the supposed error rate, it causes errors.

These days, the spread spectrum communication is expected to be used in various frequency bands, places and conditions, so it is assumed that radio wave condition differs to a great extent depending on service places. Namely, it is supposed that, if only a uniform or standard error correction function is provided, communication quality cannot be maintained sufficiently in some of various service forms. Moreover, it is clear beforehand that many errors are produced in a data transmission of a specific frequency band. Therefore, it is undesirable transmit data with hopping frequencies including such frequency band, in view of its transmission efficiency, transmission rate and communication quality.

SUMMARY OF THE INVENTION

In view of the above, it is an object of the invention to provide a frequency hopping communication method and apparatus that is adaptable to various communication environments to be used and able to improve transmission efficiency, transmission rate and communication quality.

In accordance with a first aspect of the invention, there is provided a frequency hopping communication method which performs communication while switching carrier frequencies for transmit data in order in accordance with spreading code series for a frequency hopping system. The method decides an error in received transmit data, specifies a hopping frequency having the error generated, and counts the error in a specified hopping frequency. Then, it changes the specified hopping frequency to an unused frequency when a counted number of the errors becomes a specified threshold or more. Thereafter, it sends data of the changed hopping frequency and the unused hopping frequency to an other party and makes the other party change a hopping frequency accordingly and continue communicating.

In the first aspect of the invention, if many errors are generated in a specified hopping frequency, such a hopping frequency is changed into another unused frequency for after communication, so that a frequency almost free from external influences may be selected and a good communication can be continued with that frequency suitable for each service environment. Accordingly, it is possible to stop using such a hopping frequency as errors occur frequently therein, and to use another desirable hopping frequency instead, thereby enabling utilization of a suitable frequency depending on various circumstances to be used. As a result, errors decrease thereby improving communication quality. Moreover, the inventive system is adaptable to various radio wave conditions, thereby needing no large error correction capacity and preventing lowering of throughput of receive data.

In accordance with a second aspect of the invention, there is provided a frequency hopping communication apparatus which performs communication while switching carrier frequencies for transmit data in order in accordance with spreading code series for a frequency hopping system. An error counting means decides an error in received transmit data, specifies a hopping frequency having the error generated, and counts the error in a specified hopping frequency. A frequency changing means changes the specified hopping frequency to an unused frequency when a counted number of the errors in the specified frequency counted by the error counting means becomes a specified threshold or more. A control data transmit means sends data of the changed hopping frequency and the unused hopping frequency to an other party.

In the second aspect of the invention, if a number of errors goes over a fixed value for a specified hopping frequency among those that are being used, such a hopping frequency is changed into another unused hopping frequency for after communication. Therefore, it is possible to stop using a hopping frequency in which errors occur frequently and use another desirable frequency, thereby showing same advantages as the first aspect.

Further objects and advantages of the invention will be apparent from the following description, wherein preferred embodiments of the invention are clearly shown.

DESCRIPTION OF PREFERRED
EMBODIMENTS

Figure 1A:
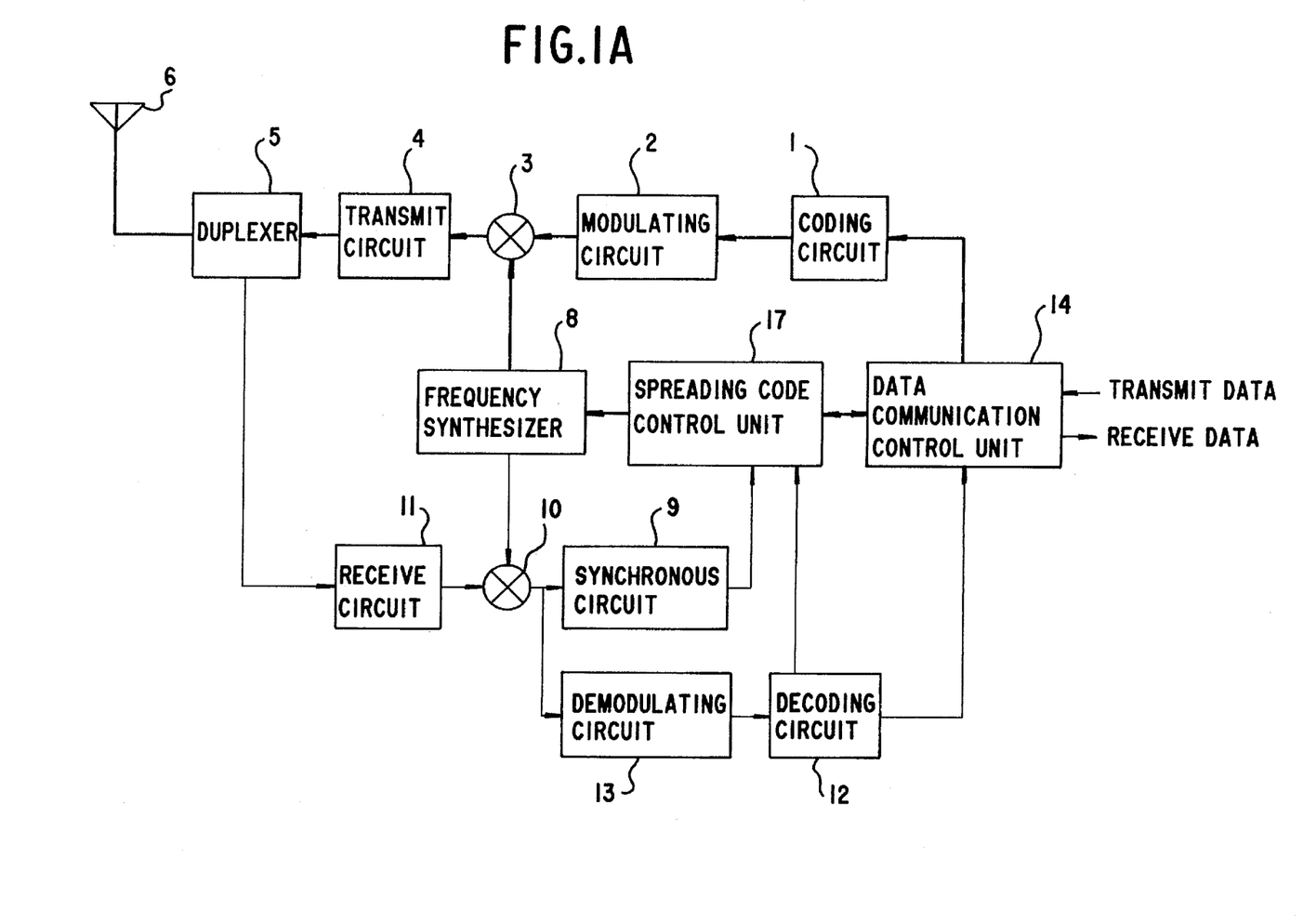
FIG. 1A is a block diagram showing a transmitting side of one embodiment of an inventive frequency hopping communication apparatus.
Figure 1B:
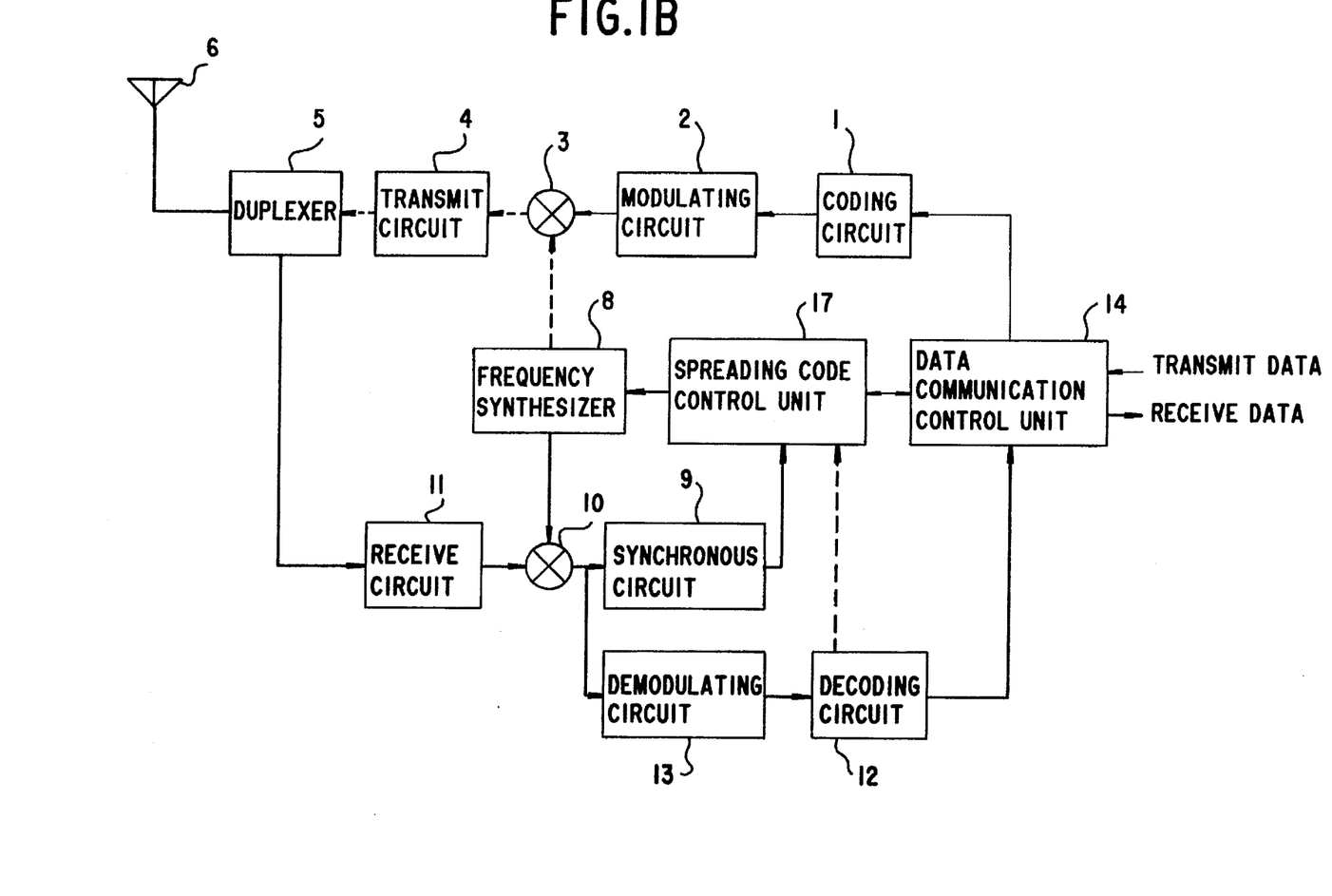
FIG. 1B is a block diagram showing a receiving side of one embodiment of an inventive frequency hopping communication apparatus.

Referring to the drawings, wherein like reference characters designate like or corresponding parts throughout the several views, one preferred mode of a frequency hopping apparatus of the invention will be described hereafter, particularly referring to FIGS. 1A and 1B. FIG. 1A shows a transmitting side and FIG. 1B shows a receiving side. The communication apparatus has the same structure at the transmitting side and the receiving side, so like reference characters designate like or corresponding parts.

A coding circuit 1 carries out a coding for data compression as well as a coding for detection and correction of errors. A modulating circuit 2 performs data modulation of coded data by use of a specific modulation signal by a modulating method like a frequency shift keying (FSK) or a phase shift keying (PSK). A mixer 3 is used for transmitting operation and mixes modulated signals by the FSK or PSK or the like with a frequency output from a frequency synthesizer 8. A transmit circuit 4 amplifies power. A duplexer 5 is a switching circuit for changing over the transmitting side and the receiving side. An aerial 6 is composed of an antenna or the like.

A receive circuit 11 cuts off signals of unnecessary frequency through a bandpass filter so as to amplify signals of a specific frequency for receive signals obtained through the aerial 6 and the duplexer 5. A mixer is used for receiving operation and mixes outputs of the synthesizer 8 and outputs of the receive circuit 11. The frequency synthesizer 8 switches a carrier frequency and outputs switched frequency in accordance with frequency data and timing signals from a spreading code control unit 17. A synchronous circuit 9 performs a synchronizing operation and its holding operation of the hopping frequency in the same manner as the synchronous circuit 9 of the related art apparatus. It outputs synchronizing signals to the spreading code control unit 17 so as to provide a timing for the frequency synthesizer 8 to switch its output frequency. A demodulating circuit 13 demodulates mixed data of the output from the synthesizer 8 and the receive outputs from the receive circuit 11, which are modulated by such modulating methods as FSK or PSK.

A decoding circuit 12 carries out judgement and correction of errors in data as well as data expansion. It informs the spreading code control unit 17 of errors generated. The spreading code control unit 17 has a spreading code generating circuit for frequency hopping system of a similar structure to that of the spreading code generating circuit 7 of related art. It selects frequency data to be outputted in accordance with spreading codes and gives instruction of a frequency to be outputted to the synthesizer 8 in accordance with the synchronizing timing from the synchronous circuit 9. Moreover, the spreading code control unit 17 counts errors from the decoding circuit 12 by a counter, stores a counted error value into a specific memory, and controls the synthesizer 8 to change the hopping frequency when the counted error value becomes a threshold α or more. Such a sequence of operations will be described in detail later referring to FIGS. 2–4. A data communication control unit 14 decomposes the transmit data into a transmitting size and composes the receive data. Moreover, it sends control data for controlling overall communication process of the inventive apparatus or the like, and analyzes such control data received from the transmit side apparatus, and performs other generally known operations. In the present embodiment, a transmitting unit is composed of the coding circuit 1, modulating circuit 2, mixer 3, transmit circuit 4, duplexer 5 and aerial 6. A receive unit is composed of the aerial 6, duplexer 5, receive circuit 11, mixer 10, synchronous circuit 9, demodulating circuit 13 and decoding circuit 12.

A transmitting operation and receiving operation of this embodiment of the FH communication apparatus are described hereafter.

In the transmitting operation, the transmit data is processed along a route shown by a heavy solid line in FIG. 1A. Namely, the transmit data inputted into the data communication control unit 14 are decomposed into a transmitting size therein, coded in the coding circuit 1 and modulated in the modulating circuit 2 by FSK or PSK. The modulated data are mixed with the hopping frequency output from the synthesizer 8 in the mixer 3, thereby being modulated substantially by the hopping frequency. Then, the data are amplified in the transmit circuit 4 and sent to the other party from the aerial 6 via the duplexer 5. The synthesizer 8 synthesizes and outputs a predetermined hopping frequencies for spreading operation corresponding to a predetermined spreading code series from the spreading code control unit 17, in the same manner as related art.

In the receiving operation, the receive data are processed along a route shown by a heavy solid line in FIG. 1B. Namely, the receive data received by the aerial 6 are inputted into a receive circuit 11 via the duplexer 5. The receive circuit 11 passes only a necessary frequency band among the received signals through the bandpass filter, and amplifies it. Then, the mixer 10 mixes the output of the receive circuit 11 and the output of the synthesizer 8 so as to carry out the inverse spreading operation. If the hopping frequencies are synchronized by the synchronous circuit 9, the spreading code control unit 17 controls the demodulating circuit 13 to modulate the inversely spread output of the mixer 10 into binary data. The binary data go through the error detection or judgement and error correction as well as the decoding operation. Decoded receive data are composed in the data communication control unit 14, thereby obtaining the original transmit data. The synthesizer 8 synthesizes and outputs a predetermined hopping frequencies for inverse spreading operation corresponding to a predetermined spreading code series from the spreading code control unit 17, in the same manner as related art.

Figure 2A:
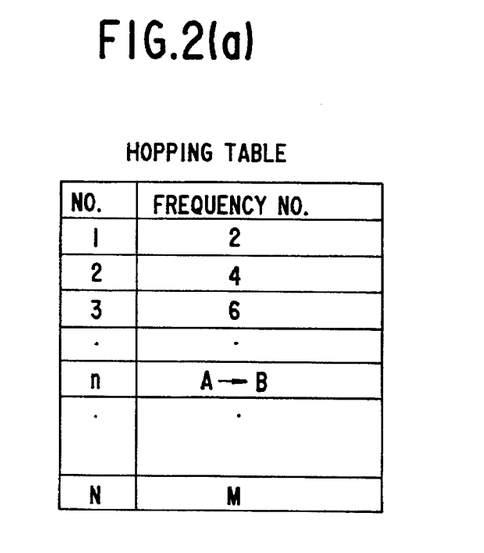
FIG. 2(a) shows a hopping table in a frequency band used in one embodiment of an inventive frequency hopping communication apparatus.
Figure 2B:
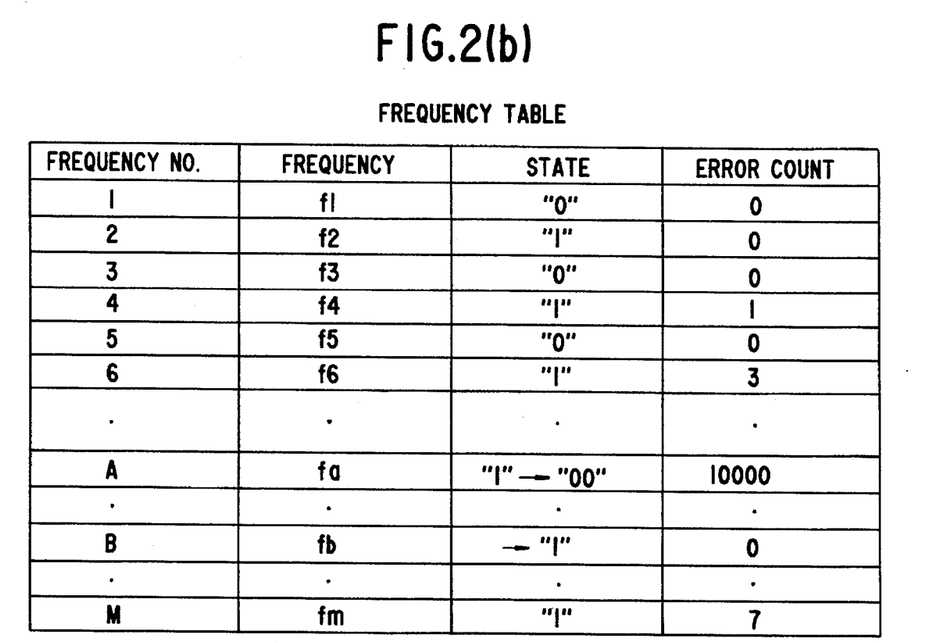
FIG. 2(b) shows a frequency table in a frequency band used in one embodiment of an inventive frequency hopping communication apparatus.

A hopping frequency control by the spreading code control unit 17 is described hereafter referring to FIGS. 2(a) and 2(b).

FIG. 2(a) shows a hopping table in a frequency band used in the present embodiment of the apparatus, while FIG. 2(b) shows its frequency table.

First, as shown in FIG. 2(b), frequencies of number M (M waves) are set at equal intervals, as the hopping frequency in the used frequency band. Among them, frequencies of number N (N waves) are actually used as the hopping frequency. Comparing the above selected number of the frequencies, there is a relation therebetween: M>N. At an initial state, the hopping frequencies are chosen at a constant order from the frequencies of number M for hopping operation in the frequency table of FIG. 2(b), thereby setting the first to the number N frequencies in the hopping table of FIG. 2(a).

For example, as shown in FIG. 2(a), this embodiment has a memory map form that numbers the numerals 1, 2, 3, - - -, n, - - -, N and that allocates one cycle of hopping pattern the frequency numbers 2, 4, 6, - - -, A, - - -, M corresponding respectively to the time series of the No. 1, No.2, No. 3, - - -, No. n, - - -, No. N. In this embodiment, there is a relation between the total number (N) for the frequency numbers in the hopping table and the total number (M) of the frequencies prepared for hopping: N=M/2.

The hopping frequencies of No. 1, No. 2, - - -, No. N as one cycle of hopping pattern are managed by the frequency table of FIG. 2(b) as follows.

The frequency table of FIG. 2(b) has a memory map form composed of "Frequency No." assigned to and used for the hopping table of FIG. 2(a), "Frequency Value" corresponding thereto, "State" showing use or disuse as the hopping frequency and "Error Count" showing a counted value of the errors.

Namely, the "Frequency No." of the frequency table is the same as the "Frequency No." of the hopping table, and correspondingly assigned to the No. 1, No.2, - - -, No. N provided in the hopping table as the order of the time series of one hopping pattern. The "Frequency Value" shows the hopping frequencies of number M stored corresponding to the "Frequency No." In the "State" area, a state flag "1" is set for a frequency currently used as the hopping frequency, while a state flag "0" is set for a frequency that has not yet been used as the hopping frequency. Moreover, a state flag "00" is set for a frequency that has been stopped using because of much errors. The "Error Count" is a memory for storing counted numbers of errors so as to be able to count the errors for each frequency currently used as the hopping frequency and determine if the counted value is not less than a predetermined threshold.

Figure 3:
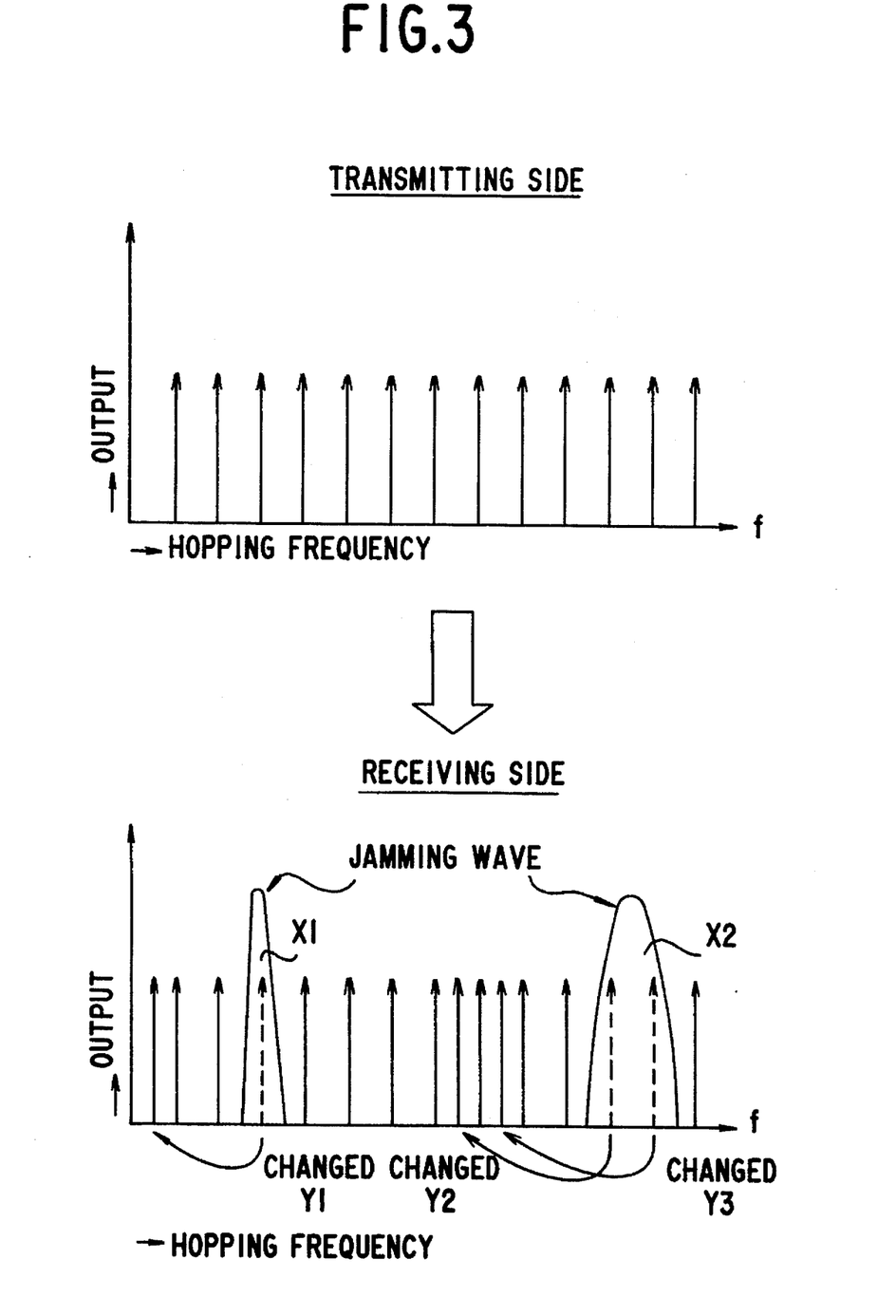
FIG. 3 is a drawing showing a concept of an operation of one embodiment of an inventive frequency hopping communication apparatus for changing hopping frequencies so as to avoid jamming waves.

One of the characteristic operation of the present embodiment of the FH communication apparatus or the hopping frequency changing operation is described referring to FIGS. 2(a) and 2(b) and FIG. 3. FIG. 3 shows a process for changing the hopping frequencies so as to avoid jamming waves.

In the setting of the one cycle of hopping pattern of the hopping table, the "Frequency No." corresponding to the time series "No." or No. 1, No. 2, NO. 3, - - -, No. N equal to "2", "4", "6", - - - "M" of the "Frequency No." of the frequency table. The frequency used as the hopping frequency is attached with the state flag "1", as shown in the frequency table. The spreading code generator contained in the spreading code control unit 17 generates the numerals of the time series No. 1, No. 2, - - -, No. N at constant periods for the well-known one cycle of hopping pattern. For example, if the numeral is "No. 3", the spreading code generator selects the frequency number "6" from the hopping table, and picks up the frequency "f6" as the hopping frequency on the basis of the frequency number "6" in the frequency table. Thus, the frequency "f6" is outputted from the synthesizer 8 as the hopping frequency. As a result, hopping frequencies of spectrum of FIG. 3 are outputted from the transmit side apparatus as one cycle of hopping pattern.

In receiving the transmit data, specific jamming waves X1 and X2 may cause errors to corresponding hopping frequencies, respectively. In this case, if such errors are informed from the decoding circuit 12 to the spreading code control unit 17, the control unit 17 gives an increment "+1" on the "Error Count" value, corresponding to the erred hopping frequency at the moment which the error is brought forth, in the frequency table. For the timing of this incremental operation, an error of a hopping frequency one before the hopping frequency currently set in the synthesizer 8 (its present output frequency) may be informed to the control unit 17, so that the hopping frequency one before the present hopping frequency is always stored in the memory. With such structure, it is possible to specify the erred frequency by the control unit 17 without fail.

For example, if the "Error Count" value in one hopping frequency "A" shown in FIG. 2(b) becomes the predetermined threshold a (10,000 in the illustrative embodiment) or more, the spreading code control unit 17 changes the "State" flag of the frequency number "A" from "1" showing the used state to "00" showing using prohibited state. At the same time, the control unit 17 searches for a frequency that has not been used at the moment and is somewhat distant from the frequency number "A", e.g. a frequency number "B", and changes the frequency number "A" into the frequency number "B" in the hopping table of FIG. 2(a). Namely, as shown by hopping frequencies "Changed Y1", "Changed Y2" and "Changed Y3" in FIG. 3, the control unit 17 moves the current hopping frequency by a predetermined frequency. Then, the control unit 17 inform the data communication control unit 14 that the hopping frequency of number n has been changed from "A" to "B" (the hopping frequency Changed Y1, Changed Y2, Changed Y3 in FIG. 3). In response to such information, the communication data control unit 14 sends the changed data, as transmitted control data, to the other party, i.e. the originally transmitting side apparatus, as shown by the heavy line in FIG. 1B. The data communication control unit 14 of the other party apparatus recognizes the control data sent from the data communication control unit 14 of the originally receiving side (see FIG. 3), and informs the spreading code control unit 17 of the changed data. Thus, the other party apparatus as the originally transmitting side rewrites the hopping table of FIG. 2(a), as in the originally receiving side apparatus.

Figure 4:
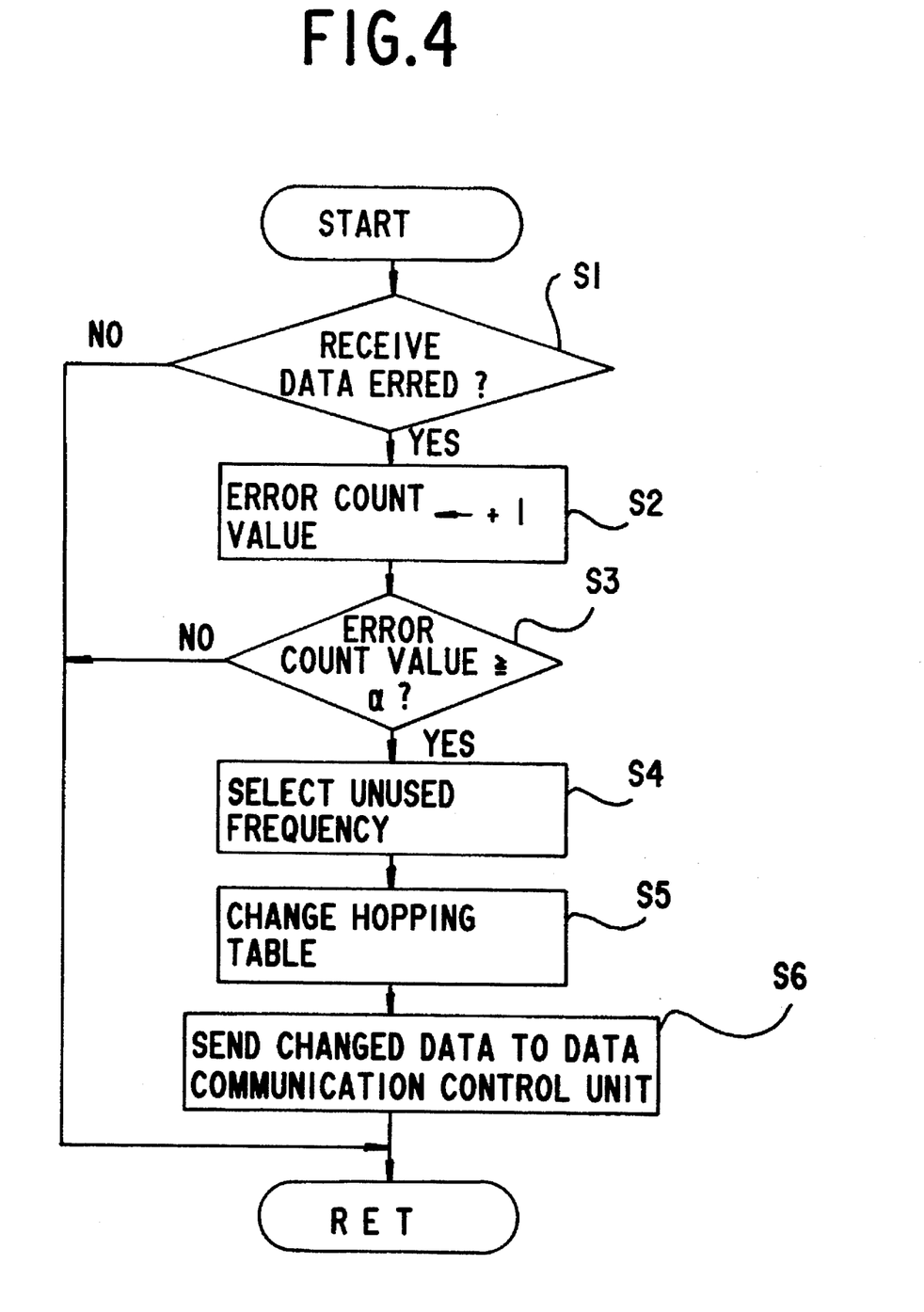
FIG. 4 is a flowchart of a hopping frequency changing program executed in a spreading code control unit of one embodiment of an inventive frequency hopping communication apparatus.

These operations are carried out by calling a program of FIG. 4 while executing a routine for FH system by the spreading code control unit 17. FIG. 4 is a flowchart of a hopping frequency changing program executed be spreading code control unit 17 of the present embodiment apparatus. The frequency hopping routine itself by the control unit 17 is similar to that of related art and well-known, so such expression will be omitted to avoid redundancy.

If the decoding circuit 12 informs the control unit 17 of an error generation in a step S1, the control unit 17 gives a "+1" increment to the "Error Count" value in the frequency table of FIG. 2(b), corresponding to the frequency in which the error is generated, in a step S2. Namely, an error counting means composed of the steps S1 and S2 of the control unit 17 detects or specify the hopping frequency in which the error is generated, counts a number of generated errors in the specified hopping frequency by the counter, and stores it into the memory as the "Error Count" value.

The control unit 17 determines if the "Error Count" value is not less than the predetermined threshold a or not in a step S3. If it is determined that the "Error Count" value is the predetermined threshold α or more, the control unit 17 searches for unused frequencies as the hopping frequency on the basis of the "State" flag "0", and selects a "Frequency NO." of a frequency somewhat distant from the erred frequency in a step S4. Then, the control unit 17 changes the "State" flag of the selected hopping frequency into "1" while changing the "State" flag of the hopping frequency in which the "Error Count" value becomes the threshold α or more into "00". Thereafter, the control unit 17 changes the "Frequency No." in the hopping table of FIG. 2(a) in a step S5. Namely, a frequency changing means composed of the steps S4 and S5 of the control unit 17 changes the erred hopping frequency to another unused frequency. In a step S6, the control unit 17 sends the data of the hopping frequency changed by the frequency changing means (changed data) to the data communication control means 14. A control data transmitting means is composed of the step S6 of the spreading code control means 17, data communication control means 14, coding circuit 1, modulating circuit 2, mixer 3, transmit circuit 4, duplexer 5 and aerial 6.

As a result, the data communication control means 14 informs the spreading code control unit 17 of the other party apparatus of the changed data as transmit control data, for use in rewriting the hopping table of FIG. 2(a) of the other party apparatus. If the receive data has no error or if the "Error Count" value is less than the predetermined threshold α, the control unit 17 exits from the above routine.

As described above, the present embodiment stops using a frequency containing erred data and uses another hopping frequency instead. Thus, it is possible to utilize a frequency suitable for individual service conditions or environments depending on jamming waves or the like. Namely, as shown in FIG. 3, since the hopping frequency can be appropriately changed by the spreading code control unit 17, it is possible to perform the frequency hopping while avoiding such frequencies as any jamming waves like existing waves and leakage waves are mixed therein, for example. Thus, the present embodiment can adapt to a various communication environments to be used and improve transmission efficiency, transmission rate and communication quality Moreover, since it is possible to always select a frequency that is almost free from external influences, the communication can be made with the hopping frequency suitable for each used environment.

While the error counting means of the above embodiment is composed of the steps S1 and S2 of the spreading code control unit 17, any kind of error counting means may be used in the invention, as long as it has a function, as a result, to make decision of errors in receive data, detect and specify the erred hopping frequency and count the error number of the specified hopping frequency.

While the frequency changing means of the above embodiment is composed of the steps S4 and S5 of the spreading code control unit 17 that changes the hopping frequency in response to the decision of the step S3 thereof, it may be constituted in another form in the invention, as long as, if the generated error number of a specified hopping frequency counted by the error counting means exceeds a specified threshold a, it changes that hopping frequency to another unused frequency. Particularly, it is preferable to avoid frequencies near the jamming waves that affect the hopping frequency, in selecting the above new hopping frequency instead of the erred one, so as to completely eliminate influences of the jamming waves. Namely, such a new hopping frequency is moved from an erred hopping frequency to be changed by a fixed frequency band that is determined beforehand in consideration of assumed influences of Jamming waves. This is because frequencies escaping from the jamming waves like existing communication waves or leakage radio waves are easy to intrude into gaps of spectrum that is being used as an existing frequency. As a matter of course, any other hopping frequency may be selected at random without any regard to the erred hopping frequency.

While the control data transmitting means of the above embodiment is composed of the step S6 of the spreading code control unit 17, data communication control unit 14, coding circuit 1, modulating circuit 2, mixer 3, transmit circuit 4, duplexer 5 and aerial 6, it may be formed in other ways in the invention, as long as it is able to send the erred and new hopping frequencies that have been changed in the frequency changing means to the other party. It may have a circuitry that prepares a predetermined signal and introduces it into between any of the data communication control unit 14, coding circuit 1, modulating circuit 2, mixer 3, transmit circuit 4, duplexer 5 and aerial 6.

The above embodiment may be modified so as to count errors of a specified frequency and decide if the errors go over a threshold at fixed time intervals. It is also possible to specify a number of repeated cycles of a hopping pattern in order to carry out such a deciding operation. Otherwise, such a decision may be made for each call and talk. As a matter of course, a specified threshold of generated error number includes one that is represented as an error generation rate.

The above embodiment may be modified so as to decide if the errors go over a threshold in a specified hopping frequency at each time of using the communication apparatus. It may also modified so as to store the hopping frequency erred over a threshold while automatically canceling it by a time, day or month, or manually canceling it at a desired time.

The preferred embodiments described herein are therefore illustrative and not restrictive, the scope of the invention being indicated in the appended claims and all variations which come within the meaning of the claims are intended to be embraced therein.

What is claimed is:

1. A frequency hopping communication method performing communication while switching carrier frequencies for the transmission of data in order in accordance with spreading code series for a frequency hopping system, comprising the steps of:

determining an error in received data;

specifying a hopping frequency having the determined error as the hopping frequency immediately previous to the currently set hopping frequency;

counting the error in the specified hopping frequency;

changing the specified hopping frequency to an unused frequency when a counted number of the errors becomes a specified threshold or more; and sending data of the changed hopping frequency and the unused hopping frequency to an other party and making the other party change a hopping frequency accordingly and continue communicating.

2. A frequency hopping communication apparatus according to claim 1, in which the frequency changing means changes the hopping frequency to another frequency by a predefined frequency band so as to avoid interference of jamming waves near the changed hopping frequency.

3. The frequency hopping communication method of claim 1, wherein the step of changing includes changing the specified hopping frequency to an unused hopping frequency which is outside a predetermined frequency range from the specified hopping frequency.

4. A frequency hopping communication apparatus performing communication while switching carrier frequencies for the transmission of data in order in accordance with spreading code series for a frequency hopping system, comprising:

an error counting means for determining an error in received data, specifying a hopping frequency having the determined error as the hopping frequency immediately previous to the currently set hopping frequency, and counting the error in the specified hopping frequency;

a frequency changing means for changing the specified hopping frequency to an unused frequency when a counted number of the errors in the specified frequency counted by the error counting means becomes a specified threshold or more; and a control data transmit means for sending data of the changed hopping frequency and the unused hopping frequency to an other party.

5. The frequency hopping communication apparatus of claim 4, wherein the frequency changing means changes the specified hopping frequency to an unused hopping frequency which is outside a frequency range of the specified hopping frequency.

6. A frequency hopping communication apparatus comprising:

a frequency synthesizer;

a transmit unit and a receive unit for sending and receiving data with an output frequency of the frequency synthesizer as a carrier frequency;

a spreading code control unit for hopping the output frequency of the frequency synthesizer to a predetermined pattern of frequencies in accordance with a prescribed spreading code series, the spreading code control unit, if used for a data receiving side, detecting an error in the data received from the receive unit, specifying a hopping frequency having the detected error as the hopping frequency immediately previous to the currently set hopping frequency, counting the error generated in the specified hopping frequency and changing the specified hopping frequency to a new hopping frequency when a counted error number becomes a fixed threshold or more; and a data communication control unit, if used for the data receiving side, sending the erred hopping frequency and the new hopping frequency to a data transmitting side of the receive data, and, if used for the data transmitting side, changing the erred hopping frequency to the new hopping frequency so as to carry out following data transmission.

7. The frequency hopping communication apparatus of claim 6, wherein the spreading code control unit changes the specified hopping frequency to a new hopping frequency which is outside a frequency range of the specified hopping frequency.

* * * * *

UNITED STATES PATENT AND TRADEMARK OFFICE
CERTIFICATE OF CORRECTION

PATENT NO.:     5,541,954
DATED      :    July 30, 1996
INVENTOR(S):    Tetsuichi EMI     It is certified that error appears in the above-identified patent and that said Letters Patent is hereby corrected as shown below:

Column 11, line 54 (Claim 2, line 2), change "1" to --4--.

Signed and Sealed this

Fourteenth Day of January, 1997

Attest:

BRUCE LEHMAN

Attesting Officer

Commissioner of Patents and Trademarks